US005654378A

United States Patent [19]

Dehennau et al.

[11] Patent Number: 5,654,378

[45] Date of Patent: Aug. 5, 1997

[54] POLYOLEFIN-BASED ARTICLES PRINTED BY MEANS OF INKS FOR PVC AND PROCESSES FOR THEIR MANUFACTURE

[75] Inventors: Claude Dehennau, Waterloo; Zdenek Hruska, Brussels; Frédéric Menu, Frameries, all of Belgium

[73] Assignee: Solvay (Société Anonyme), Brussels, Belgium

[21] Appl. No.: 423,151

[22] Filed: Apr. 17, 1995

[30] Foreign Application Priority Data

Apr. 19, 1994 [BE] Belgium ................................ 09400403

[51] Int. Cl.[6] ........................................................ C08F 8/22

[52] U.S. Cl. ..................................... 525/333.7; 525/333.8; 525/356; 525/388

[58] Field of Search ..................................... 525/356, 388, 525/333.7, 333.8

[56] References Cited

U.S. PATENT DOCUMENTS 4,296,151 10/1981 Boultinghouse .

FOREIGN PATENT DOCUMENTS 0257321 3/1988 European Pat. Off. .
920138642 12/1993 Japan .
93/24559 12/1993 WIPO .

OTHER PUBLICATIONS

"Surface Pretreatment of Polymer Webs . . . ", Milker et al, Coating 1988.

"Fluorine Makes Plastics Flexible", Milker et al., 1989.

Stradal et al.: "The Effect of Corona and Ozone Treatment on the Adhesion of Ink to the Surface of Polyethylene". In: Polymer Engineering and Science, Jan. 1977, vol. 17, No. 1, pp. 38–41.

Journal of Applied Polymer Science, Appl. Polym. Symp., vol. 46, 61 (1990).

Journal of Applied Polymer Science, vol. 50, 585–599, (1993). "An XPS Investigation of Polymer Surface Dynamics. I. A Study of Surfaces Modified by $CF_4$ and $CF_4/CH_4$ Plasmas".

*Primary Examiner*—Bernard Lipman
*Attorney, Agent, or Firm*—Spencer & Frank

[57] ABSTRACT

The invention relates to articles including at least one polyolefin, which are surface-treated and printed with inks for PVC, which are characterized by the surface presence of fluorine and oxygen in concentrations such that the oxygen/carbon atomic ratio (O/C), measured by ESCA spectroscopy at a depth of 1.5 nm, is at least 0.08 and that the fluorine/carbon atomic ratio (F/C) (measured in the same way) has a value of at least 90% of that of the O/C ratio and of not more than 290% of this ratio. It also relates to a process for their manufacture.

12 Claims, 1 Drawing Sheet

POLYOLEFIN-BASED ARTICLES PRINTED BY MEANS OF INKS FOR PVC AND PROCESSES FOR THEIR MANUFACTURE

FIELD OF THE INVENTION

The invention relates to polyolefin-based articles printed by means of inks for poly(vinyl chloride) (PVC) and to a process for their manufacture.

TECHNOLOGY REVIEW

In many applications, articles consisting of plastic, and in particular films, sheets and hollow bodies, are printed by means of conventional printing techniques such as silk-screen printing, photogravure or flexography.

Inks have been developed specifically for printing on articles consisting of certain polymers exhibiting fairly specific surface polarity characteristics, such as a high surface tension, for example on articles based on polymethyl methacrylate (PMMA) or polyvinyl chloride (PVC); they are generally referred to as "inks for PVC".

Inks for PVC are highly valued by printers because they impart to the printed designs a print quality which is superior to that generally obtained by means of other types of inks for plastics. As stated above, these inks can be employed on articles made of PVC, for example on PVC films. However, increasingly more frequent attempts are currently being made by plastics converters in order to substitute polyolefins (PO) for PVC. To meet this demand new surface treatment techniques have had to be developed by the plastics and paints industry in order to make it possible to print PO articles on conventional printing lines. In fact, because of their nonpolarity, some plastics such as polyolefins require, before they are printed, an appropriate surface treatment such as corona discharge, flaming, plasma treatment, fluorination or oxyfluorination, and the use of an ink adapted to these materials. Although these treatments increase the polarity of the surfaces thus treated, the inks employed for printing these articles remain specific to them; they are commonly referred to as "inks for polyolefins". Unfortunately, these inks are inefficient for printing articles made of PVC, to which they do not adhere. Similarly, inks employed for printing PVC generally do not adhere to polyolefin-based articles, even when the latter have been surface-treated.

This situation obliges the printers to change an ink depending on whether they are printing PVC articles or polyolefin (PO) articles, and this involves complete cleaning of the plant. In addition, printers remain highly interested in inks for PVC, which in many cases give a superior print quality.

There is therefore a continuing market demand either for a PO film printable both with inks for PVC and with inks for PO, or for a universal ink which is as effective as the inks for PVC but usable both on surface-treated PO supports and on PVC supports. Neither of these two solutions is available as present.

Much work has been done to explain the adhesiveness of inks by the chemical modifications to which the articles surface-treated by treatments such as corona discharge or flaming are subjected at the surface. For example in the case of polyethylene articles, the adhesiveness and the degree of oxidation of the surface after the treatment have been correlated (The Effect of Corona and Ozone Treatment on the Adhesion of Ink to the Surface of Polyethylene—Polymer Engineering and Science, Jan. 1977, vol. 17, No. 1, pp. 38–41). Plasma treatment has also been widely investigated; unfortunately, this technique is costly and remains restricted to noncontinuous treatments of products of high added value, and this rules out the continuous treatment of running products such as PO-based films. Special attention has been given in recent years to techniques involving fluorination (as described, for example, in U.S. Pat. No. 4,296,151) and oxyfluorination. Both these techniques, which can be practised continuously, are known to improve the adhesiveness of ink or of various coatings to PO-based articles. In a document (WO 93/24559) relating to packaging films exhibiting certain tribological properties and characteristics making them subsidiarily suited for certain types of printing it has furthermore been recommended to employ particular surface contents of oxygen and of fluorine.

At the present time, however, despite all this work, no solution makes it possible to produce polyolefin-based articles which are printable equally well with inks for PVC or for PO.

Furthermore, some of the surface treatments referred to above are effective only in the short term, that is to say that, for example, a polyolefin film treated by corona discharge is actually suitable for better quality printing with an ink for PO during the weeks that follow its treatment, but loses this property as time passes. This constitutes a considerable industrial and economic disadvantage, seeing that most articles are printed elsewhere than at their place of manufacture, or are stored before being printed, which means that a period of several months can sometimes separate their manufacture and their printing.

SUMMARY OF THE INVENTION

A first objective of the invention is therefore an article in which at least a surface region includes at least one polyolefin and which is surface-treated by means of oxygen and fluorine and printed by means of an ink for PVC.

DETAILED DESCRIPTION OF THE INVENTION

Figure 1:
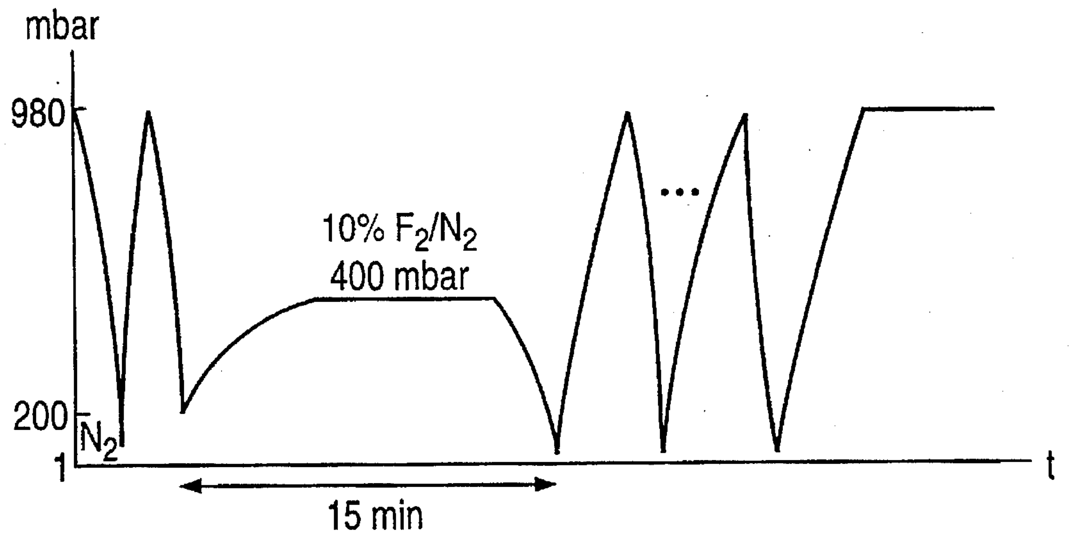
FIGS. 1 and 2 show the change with time in the pressure prevailing in the treatment chamber during the surface treatment cycles 1 and 2 employed in some of the examples. In each of these figures the abscissa axis corresponds to time and the ordinate axis corresponds to pressure (expressed in mbar).

More precisely, the invention relates to an article printed by means of an ink for PVC, in which at least a surface region includes at least one polyolefin and has been treated by means of oxygen and fluorine, characterized by the surface presence of fluorine and oxygen in concentrations such that the oxygen/carbon atomic ratio (O/C) measured by ESCA spectroscopy at a depth of 1.5 nm is at least 0.08, and that the fluorine/carbon atomic ratio (F/C), measured in the same way, has a value of at least 90% of that of the O/C ratio and of not more than 290% of this ratio.

The articles aimed at within the scope of the present invention may be any type, especially films, sheets or plates, or else hollow bodies such as bottles, drums, storage containers, flasks, pipes and the like. The invention is particularly advantageous in the case of flat articles, especially in the case of films. These flat articles may be produced by any means, especially by calendering, by extrusion or by coextrusion, for example by blow-extrusion, extrusion-coating, extrusion with a flat die, and by related coextrusion techniques. In accordance with the invention at least one surface region of the article must include at least one polyolefin. This region preferably consists essentially of at least one polyolefin. One or several other parts of the article may consist essentially of one or several other materials such as a metal or a cellulose-based material. The invention applies to single-layer and multilayer articles. Thus, for example, the invention applies inter alia to multilayer articles in which at least the printed surface layer is polyolefin-based, it being possible for one or several other layers to consist essentially of one or several other materials.

The abovementioned definition of the surface region refers to the surface of the article before its printing and not to the ink with which it may eventually be covered.

In accordance with the invention the articles are printed by means of an ink for PVC. "Ink for PVC" is intended to mean an ink which, when applied onto a PVC substrate, adheres well to the latter, that is to say obtains a classification of "1" or "2" in the test defined by the ASTM standard D-3359 ("scotch tape test"). Nonlimiting examples of such inks are provided below, together with examples of printing processes.

Polyolefins are intended to denote both olefin homopolymers and copolymers including at least 70% of units derived from olefins, any copolymer consisting of at least two different types of olefins, and mixtures of these homo- and/or copolymers. Olefins are intended to denote both monoolefins such as ethylene, propylene or butene, and olefins containing more than one double bond, for example diolefins such as butadiene. Propylene and ethylene polymers may be mentioned as nonlimiting examples of polyolefins. Both their homopolymers and their copolymers are thus intended to be denoted, it being optionally possible for the latter to include, besides propylene and/or ethylene, one or several other olefinic comonomers, the total quantity of the latter preferably remaining lower than 20% relative to the weight of the copolymer. Advantageous results have been obtained with articles in which the treated surface region consists essentially of a propylene polymer or of a mixture of 50 to 99% (relative to the total weight of the polymers) of at least one propylene polymer and of 50 to 1% of at least one ethylene polymer.

In addition, one or several conventional inorganic fillers may be optionally added to this or to these polyolefins, such as calcium carbonate, titanium dioxide, mica and the like, as can be reinforcing fibres such as, for example, glass or carbon fibres, as well as one or several conventional additives such as stabilizers, lubricants, antioxidants and the like.

Besides one or several polyolefins, fillers and additives as set out above, the articles concerned may optionally include one or several other polymers intended to impart particular properties to them, for example with a view to improving their impact strength.

In the treated surface region the O/C atomic ratio is preferably higher than 0.1. The O/C ratio is furthermore generally lower than 0.40 and preferably lower than 0.30. The F/C atomic ratio is advantageously higher than 95% of the O/C ratio. It is preferably lower than 200% of this ratio.

The ESCA spectroscopy (Electron Spectroscopy for Chemical Analysis) employed for measuring the oxygen and fluorine contents is described especially in "Practical Surface Analysis", vol. 1, D. Briggs and M. P. Seah Eds., J. Wiley & Sons Ltd, 1990.

It should be noted that, in addition to the stability of their printability in the course of time, a particularly important advantage of the articles exhibiting these characteristics is that they are printable with all types of inks and especially with inks for PVC, in contrast to the articles known hitherto.

A second objective of the present invention relates to a process enabling these articles to be manufactured and, more precisely, a process for surface treatment of an article intended to be printed, in which at least a surface region includes at least one polyolefin, including at least an oxidation stage and a fluorination stage, in conditions such that the said region contains fluorine and oxygen at the surface in concentrations such that the oxygen/carbon atomic ratio (O/C), measured by ESCA spectroscopy at a depth of 1.5 nm, is at least 0.08 and that the fluorine/carbon atomic ratio (F/C), measured in the same way, has a value of at least 90% of that of the O/C ratio and of not more than 290% of this ratio.

This article is advantageously intended to be printed by means of an ink for PVC.

The article concerned may be treated either over the whole of its surface or on one or several regions of its surface, corresponding to the above definitions. For example, in the case of a multilayer film in which only one of the two outer layers is polyolefin-based, it is possible to surface-treat only this layer or even a certain region of this layer, without departing from the scope of the present invention. The abovementioned values relating to the oxygen and fluorine concentrations quite obviously apply only to the regions including at least one polyolefin and which have actually been surface-treated.

The surface treatment by means of oxygen and fluorine may be performed by any known method, continuously or noncontinuously, provided that it produces the abovementioned F/C and O/C ratios. In the surface-treated region the O/C atomic ratio is preferably higher than 0.1. The O/C ratio is furthermore generally lower than 0.40 and preferably lower than 0.30. The F/C atomic ratio is advantageously higher than 95% of the O/C ratio. It is preferably lower than 200% of this ratio. Concrete examples of surface treatment are given in the abovementioned documents U.S. Pat No. 4,296,151 and WO 93/24559.

This surface treatment process applies to any type of article, as defined above. It gives good results when applied to films.

Fluorination is intended to denote any known treatment carried out by means of a gas mixture containing fluorine and enabling the latter to be chemically bonded to a plastic. Examples of this are given in the abovementioned documents U.S. Pat. No. 4,296,151 and WO 93/24559. A mixture of nitrogen and of 1 to 10% by volume of fluorine is preferably employed. Good results have been obtained by heating the vessel and/or the gas mixture during the fluorination stage. The duration of treatment is obviously related to all the operating conditions. The fluorination is generally of short duration. The fluorination period is advantageously not more than 12 seconds. It preferably does not exceed 4 seconds and still more preferably does not exceed 2 seconds.

Oxidation is intended to denote any known treatment carried out enabling oxygen to be chemically bonded to a plastic. A well-known example of such treatment consists in employing a gas mixture containing oxygen. Other examples of oxidation stages will be given below ("energetic surface oxidation stages").

The oxidation stage and the fluorination stage may take place in any order.

The fluorination and oxidation stages may be optionally combined. In practice it is furthermore very difficult, especially in plants operating continuously, to prevent the presence of traces of oxygen during the fluorination.

According to an alternative form, the surface treatment process includes an oxyfluorination stage, that is to say a treatment by means of a gas mixture including oxygen and fluorine. This allows oxygen and fluorine to be incorporated simply and simultaneously at the surface of the treated articles. According to a particularly simple alternative form the process consists solely of an oxyfluorination stage.

According to another alternative form the oxidation includes an energetic surface oxidation stage. This alternative form produces outstanding results.

"Energetic surface oxidation" is intended to denote any high-energy oxidative treatment such as flaming, corona discharge, plasma treatment in the presence of oxygen, ozone treatment or else a stage of oxidation with oxygen with heating to a temperature below the melting temperature of the material of the region, as well as combinations of several of these treatments.

When oxidation with oxygen with heating is adopted, the region is preferably brought to a temperature from 20° to 90° C. lower than the melting temperature of its constituent material. This heating may be produced by any known means, for example by infrared radiation or by blowing hot air.

The energetic surface oxidation preferably includes a corona treatment.

An oxidation with heating and a corona treatment are advantageously combined.

The energetic surface oxidation and the fluorination may take place in any order. They may also be simultaneous, for-example using a cold plasma treatment, as described especially in J. Appl. Polym. Sc., Appl. Polym. Symp., vol. 46, 61 (1990) and in J. Appl. Polym. Sc., vol. 50, 585 (1993) or using oxyfluorination with heating. It is generally preferred that these treatments should be separated in time. In this case it is preferred very particularly that at least one fluorination stage should be preceded by at least one energetic surface oxidation stage. The intervals separating the various stages are immaterial, provided that the activation effect of a given stage still remains at the time of the following one. The surface treatment process may thus include an energetic surface oxidation stage followed by a fluorination stage a few days later. Nevertheless, in the particular case where the energetic surface oxidation includes an oxidation with heating, the oxidation with heating is in most cases rapidly followed by the fluorination stage, and both these treatments are preferably even simultaneous. However, especially for reasons of production efficiency, it is furthermore preferred to perform all of the surface treatment continuously, the various stages referred to above being carried out one following the other and without considerable intervals. In a particularly preferred manner the surface treatment is performed in line with the stages of manufacture of the articles (extrusion and the like).

As stated above, the surface treatment process thus defined makes it possible to obtain articles in which at least a surface region includes at least one polyolefin to which the inks for PVC adhere well even when the printing takes place several months after their manufacture.

A final objective of the present invention relates to a process of manufacture of a printed article in which at least a surface region includes at least one polyolefin, including a specific surface treatment as defined above and at least one stage of printing of this region by means of an ink for PVC.

The printing may be done by any known process, for example by silk-screen printing, photogravure, flexography or by means of a doctor blade.

It is furthermore clear that it is only in the case where the printing is done on the regions including at least one polyolefin, which have been surface-treated so as to produce the fluorine and oxygen concentrations shown, that the invention reveals its surprising advantages.

EXAMPLES

The present invention and the advantages which it provides are illustrated by the examples which follow, no limitation being implied. Examples 1R to 8R, 14R to 17R and 19R are given by way of comparison.

In these examples the printing of the films is performed by coating with the aid of a doctor blade which permits the deposition of a 6 μm layer; the ink drying time (at ambient temperature) is set at 3 hours for all the inks employed.

The surfaces of the treated films are evaluated by:

measurement of the F and O surface contents expressed by the F/C and O/C atomic ratios determined by ESCA spectroscopy at a depth of 1.5 nm; the measurements are made with the aid of an SSI spectrometer (Surface Sciences Laboratories) employing the Al Kα photon source;

the total surface tension $\gamma^T$ and its dispersive and polar components ($\gamma^d$ and $\gamma^P$ respectively), which are calculated from the angles of contact of various liquids using the Kaelble method (Journal of Adhesion, vol. 2, p. 66, Apr. 1970);

or by default (Ex. 12 and 13) the surface tension, measured with test inks according to ASTM standard D-2587-67 (version of 24.2.1984).

EXAMPLE 1R

A transparent polypropylene (PP) homopolymer film of 100 μm thickness, extruded from Moplen® F30S resin (Himont) was employed.

This film was treated by corona discharge with the aid of equipment of Ahlbrandt® trademark at a speed of 12 m/min. This system employs a generator of 5402 type (frequency 30 kHz; voltage 14 kV). The two electrodes, ceramic-coated, are at a distance of 3 mm from the counterelectrode. The output current is 5.6 A.

EXAMPLE 2R

A film identical with that employed in Example 1R was treated by flaming with the aid of equipment of Aerogen® trademark at a speed of 30 m/min. The unit employs a burner of Aerogen AT533 type. The gas employed is propane. The oxygen content of the gas mixture is maintained at 20.00±0.02% by volume (measured with the aid of a paramagnetic cell of Servomex® 1420 type). The distance between the burner and the film surface is 30 mm.

EXAMPLE 3R

A film identical with that of Example 1R was treated by plasma discharge with the aid of equipment of Hitachi® trademark employing the radio frequency mode (13.56 MHz) at a speed of 12 m/min. The plasma-coupled voltage is 6.8 kV. The equipment is fitted with electrodes and treats only one face of the film. The pressure in the chamber is maintained at 1.33 Pa. The gas employed is nitrogen, the flow rate of which is 100 ml/min.

The results of Examples 1R to 3R appear in Table 2 below.

In the case of the Examples 4R to 11, which follow, noncontinuous fluorination equipment from Fluorotech GmbH was employed. The samples of films are suspended in a cylindrical chamber into which nitrogen and fluorine are introduced. The temperature of the chamber was maintained at 25° C. An $F_2/N_2$ mixture containing 10% of $F_2$ was employed for the treatments. The purges at the beginning or at the end of the surface treatment cycle were performed with nitrogen.

Figure 2:
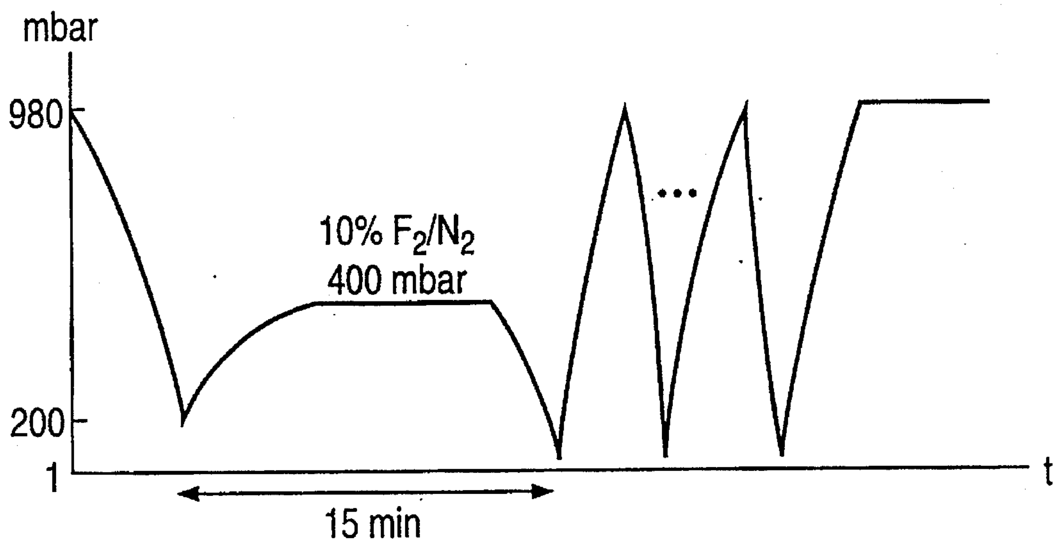

In the case of tests 4R to 11 the fluorination was performed noncontinuously and according to one of the following two cycles: a fluorination cycle (cycle 1—FIG. 1), and an oxyfluorination cycle (cycle 2—FIG. 2).

Without detailing their purge stages, these two cycles can be summarized as follows:

- cycle 1: exposure of the film to an $F_2/N_2$ mixture containing 10% by volume of fluorine, at a total pressure of 400 mbar for 15 minutes, after having emptied the treatment chamber of the air which it contained;
- cycle 2: similar to cycle 1, but with the treatment chamber having been emptied only partially (200 mbar) of the air which it contained.

In both cycles the total pressure was, however, slightly lower than 400 mbar at the beginning and at the end of the treatment period, as a result of the progressive filling and draining of the treatment chamber.

EXAMPLE 4R

A transparent film of 100 μm thickness, extruded from a polypropylene-polyethylene (PP-PE) copolymer (Moplen EP2C 30F resin from Himont) was employed. The film was fluorinated according to the surface treatment cycle 1 (fluorination).

EXAMPLE 5R

A film of 100 μm thickness consisting of the same copolymer as in Example 4R but additionally filled with $TiO_2$ (17.5% by weight relative to the polymer) was employed. The film was fluorinated according to the surface treatment cycle 1 (fluorination).

EXAMPLE 6R

A transparent PP homopolymer film of 100 μm thickness, extruded from Moplen F30S resin and fluorinated according to surface treatment cycle 1 (fluorination) was employed.

EXAMPLE 7R

A PP homopolymer film of 100 μm thickness, filled with $TiO_2$ (17.5%), extruded from the same Moplen F30S resin and fluorinated according to surface treatment cycle 1 (fluorination) was employed.

EXAMPLES 8R-9-10

These examples differ from Examples 4R, 6R and 7R respectively only in the choice of the surface treatment cycle 2 (oxyfluorination).

EXAMPLE 11

In this example, in accordance with the invention, an extruded Eltex® XF714 (Solvay) high-density PE (HDPE) film of 150 μm thickness was fluorinated according to surface treatment cycle 2 (oxyfluorination).

EXAMPLES 12–13

In the case of these tests, carried out continuously, the films passed through a chamber fed continuously, at a total pressure of 1 bar, with a treatment gas mixture containing an inert gas (nitrogen) and fluorine, also in the presence of oxygen.

In Example 12, in accordance with the invention, a film identical with that of Example 1R was fluorinated in line at a speed of 5 m/min, in equipment such that the treatment period was 12 s. The treatment gas contained, by volume, 5% of fluorine and 95% of nitrogen.

In Example 13, also in accordance with the invention, a film identical with that of Example 5R was fluorinated in line in the same conditions as in Example 12.

The results of Examples 4R to 13 appear in Tables 1 and 2.

Table 1 reproduces the values of the total surface tension $\gamma^T$ and of its dispersive and polar components $\gamma^d$ and $\gamma^p$ for Examples 4R to 11, as well as the total surface tension for Examples 12 and 13.

The adhesiveness of the inks for PVC and for PO was measured. These results, together with the F/C and O/C atomic ratios at 1.5 run, are given in Table 2.

By comparing Tables 1 and 2 it can be seen that the total surface tension alone does not enable the measured adhesiveness levels to be predicted. It may be noted, however, that it appears advantageous for the polar and dispersive components of the total surface tension to be very high.

TABLE 1

Total surface tension $\gamma^T$ and its dispersive and polar components ($\gamma^d$ and $\gamma^p$) for a series of films surface-treated according to the cycle shown in the column "Cycle". The data shown for Examples 12 and 13 are surface tensions measured with test inks according to ASTM standard D-2587-67.

| Example | Polymer | Cycle | $\gamma^T$ (mN/m) | $\gamma^d$ (mN/m) | $\gamma^p$ (mN/m) |
|---|---|---|---|---|---|
| 4R | PP-PE | 1 | 41.1 | 29.1 | 12.0 |
| 5R | copo | 1 | 27.5 | 21.7 | 5.8 |
| 6R | PP | 1 | 35.0 | 26.7 | 8.3 |
| 7R | | 1 | 30.0 | 22.3 | 7.7 |
| 8R | PP-PE copo | 2 | 55.1 | 27.6 | 27.5 |
| 9 | PP | 2 | 51.4 | 27.7 | 23.7 |
| 10 | | 2 | 45.5 | 25.5 | 20.0 |
| 11 | HDPE | 2 | 54.6 | 33.1 | 21.5 |
| 12 | PP | continuous | 55 | | |
| 13 | PE-PP copo | continuous | 42 | | |

TABLE 2

F/C and O/C atomic ratios (1.5 nm) and adhesiveness of Inks for PVC and for PO with a series of films oxidized and fluorinated according to the prior art and treated according to the invention.

| | Surface Composition (ESCA) | | Ink adhesiveness (*) | | | | |
|---|---|---|---|---|---|---|---|
| | | | PO inks | | | PVC inks | |
| Example | O/C | F/C | A | B | C | D | E |
| 1R | 0.12 | 0 | 1 | 1 | 1 | 3 | 1 |
| 2R | 0.16 | 0 | 1 | 1 | 1 | 3 | 1 |
| 3R | 0.22 | 0 | 1 | 1 | 1 | 4 | 2 |
| 4R | 0.09 | 0.27 | 1 | 3 | 1 | 3 | 2 |
| 5R | 0.05 | 0.53 | 1 | 5 | 1 | 2 | 3 |
| 6R | <0.05 | 0.62 | 1 | 3 | 1 | 2 | 2 |
| 7R | 0.08 | 0.58 | 1 | 5 | 1 | 2 | 3 |
| 8R | 0.10 | 0.07 | 1 | 1 | 1 | 2 | 2 |

TABLE 2-continued

F/C and O/C atomic ratios (1.5 nm) and adhesiveness of Inks for PVC and for PO with a series of films oxidized and fluorinated according to the prior art and treated according to the invention.

| Example | Surface Composition (ESCA) O/C | Surface Composition (ESCA) F/C | Ink adhesiveness (*) PO inks A | B | C | PVC inks D | E |
|---|---|---|---|---|---|---|---|
| 9 | 0.12 | 0.14 | 1 | 1 | 1 | 2 | 1 |
| 10 | 0.18 | 0.26 | 1 | 1 | 1 | 2 | 1 |
| 11 | 0.29 | 0.28 | 1 | 1 | 1 | 1 | 1 |
| 12 | 0.25 | 0.40 | 1 | 1 | 1 | 1 | 1 |
| 13 | 0.12 | 0.14 | 1 | 1 | 1 | 1 | 1 |

Inks for PO:
A. Lorilleux ® Pacific (water-based)
B. SICPA ® Ethyflex (solvent-based)
C. SICPA ® Brilloflex (water-based)
Inks for PVC:
D. SICPA Sicpaleau (water-based)
E. SICPA Vinyloflex (solvent-based)
(*) Adhesiveness evaluated according to ASTM standard D-3359:
5. Very poor
4. Poor
3. Average
2. Good
1. Very good

EXAMPLES 14R–16R—Aging tests

A4 format samples of films 1R, 2R and 3R were placed with the treated face uppermost for 100 hours in a ventilated oven at 70° C. After this aging the films were printed by means of the inks A and E; their adhesiveness was very poor (score "5" according to ASTM D 3359).

Samples of the same films were also stored at ambient temperature for 12 months; after this storage the adhesiveness of inks A and E was also very poor ("5").

On the other hand, films of Examples 9 to 11, in accordance with the invention, remain perfectly printable, this being both with inks for PO and with inks for PVC, after storage for 12 months at ambient temperature.

Films of Examples 12 and 13, in accordance with the invention, also remain perfectly printable, both with inks for PO and with inks for PVC, after storage for 100 hours in a ventilated oven at 70° C.

EXAMPLE 17R

An extruded film consisting of a mixture of PP (Eltex P HL001) and of PE (Eltex B 4020) (80:20 by weight) was treated continuously at a speed of 5 m/min (corresponding to a treatment period of 12 s) by means of a gas mixture including (by volume) 10% of fluorine and 90% of nitrogen.

EXAMPLE 18

Before being fluorinated, the same film as in Example 17R was subjected to a corona treatment in the same conditions as in Example 1R but at a speed of 5 m/min.

EXAMPLE 19R

A calendered film consisting of an Eltex P KL 177 PP-PE copolymer including 11 phr of $TiO_2$ was treated continuously at a speed of 5 m/min by means of a gas mixture including (by volume) 5% of fluorine and 95% of nitrogen.

EXAMPLE 20

Before being fluorinated, the same film as in Example 19R was subjected to a corona treatment in the conditions mentioned in Example 18.

The samples obtained according to Examples 17R to 20 were subjected to aging for 100 hours in a ventilated oven at 70° C. The table which follows shows the initial surface tension ($T_O$) and the surface tension after aging ($T_a$) which are measured by means of test inks according to ASTM standard D-2587-67, together with the adhesiveness of the ink for PVC E, evaluated after the aging, according to ASTM standard D-3359.

| Example | $T_O$ (mN/m) | $T_a$ (mN/m) | Adhesiveness of ink E |
|---|---|---|---|
| 17R | 56 | 50 | 4 |
| 18 | 56 | 54 | 1 |
| 19R | 40 | 32 | 4 |
| 20 | 48 | 39 | 1 |

Examples 18 and 20 show that the films which have been subjected to a corona treatment before their fluorination exhibit a surface tension which is more stable with time and higher. In addition, their printability is excellent, both with inks for PVC and for PO, in contrast to the films of Examples 17R and 19R.

What is claimed is:

1. In an article including a surface region printed by means of an ink for PVC, the improvement wherein at least said printed surface region includes at least one polyolefin and said printed surface region has been treated by means of oxygen and fluorine, such that the oxygen/carbon atomic ratio (O/C) measured by ESCA spectroscopy at a depth of 1.5 nm is at least 0.08 and less than 0.40 and that the fluorine/carbon atomic ratio (F/C), measured in the same way, has a value of at least 90% of that of the O/C ratio and of not more than 290% of this ratio.

2. The printed article according to claim 1, in the form of a film.

3. The printed article according to claim 1, in which the treated surface region consists essentially of a propylene polymer or of a mixture of 50 to 99% (relative to the total weight of the polymers) of at least one propylene polymer and of 50 to 1% of at least one ethylene polymer.

4. A process for surface treatment of an article adapted to be printed with an ink for PVC in which at least a surface region includes at least one polyolefin, including at least an oxidation stage and a fluorination stage, in conditions such that the said surface region contains fluorine and oxygen at the surface in concentrations such that the oxygen/carbon atomic ratio (O/C), measured by ESCA spectroscopy at a depth of 1.5 nm, is at least 0.08 and less than 0.40 and that the fluorine/carbon atomic ratio (F/C), measured in the same way, has a value of at least 90% of that of the O/C ratio and of not more than 290% of this ratio.

5. The surface treatment process according to claim 4, in which the oxidation stage includes an energetic surface oxidation.

6. The process according to claim 5, in which the energetic surface oxidation includes a corona treatment.

7. A process of manufacture of a printed article in which at least a surface region to be printed includes at least one polyolefin, including a treatment of said surface region comprising an oxidation stage and a fluorination stage, in conditions such that the said surface region to be printed contains fluorine and oxygen at the surface in concentrations such that the oxygen/carbon atomic ratio (O/C), measured by ESCA spectroscopy at a depth of 1.5 nm, is at least 0.08 and less than 0.40 and that the fluorine/carbon atomic ratio (F/C), measured in the same way, has a value of at least 90% of that of the O/C ratio and of not more than 290% of this ratio, and at least one stage of printing of said surface region by means of an ink for PVC.

8. An article adapted to be printed by means of an ink for PVC, made by the process of claim 4.

9. An article adapted to be printed by means of an ink for PVC, made by the process of claim 5.

10. An article adapted to be printed by means of an ink for PVC, made by the process of claim 6.

11. The process according to claim 5, in which the energetic surface oxidation stage precedes said fluorination stage.

12. A process of manufacture of a printed article in which at least a surface region to be printed with an ink for PVC includes at least one polyolefin, including a corona treatment of said surface region producing an energetic surface oxidation, followed by a fluorination stage, in conditions such that said surface region contains fluorine and oxygen at the surface in concentrations such that the oxygen/carbon atomic ratio (O/C), measured by ESCA spectroscopy at a depth of 1.5 nm, is at least 0.08 and less than 0.40 and that the fluorine/carbon atomic ratio (F/C), measured in the same way, has a value of at least 90% of that of the O/C ratio and of not more than 290% of this ratio, and at least one stage of printing said surface region by means of an ink for PVC.

* * * * *